May 28, 1968  A. HARAUTUNEIAN  3,385,301
BALLOON CATHETER HAVING A DEFORMABLE ONE-WAY INFLATION VALVE
Filed Oct. 11, 1965  2 Sheets-Sheet 1

INVENTOR
ANDREW HARAUTUNEIAN
BY
Larry N. Barger
ATTORNEY

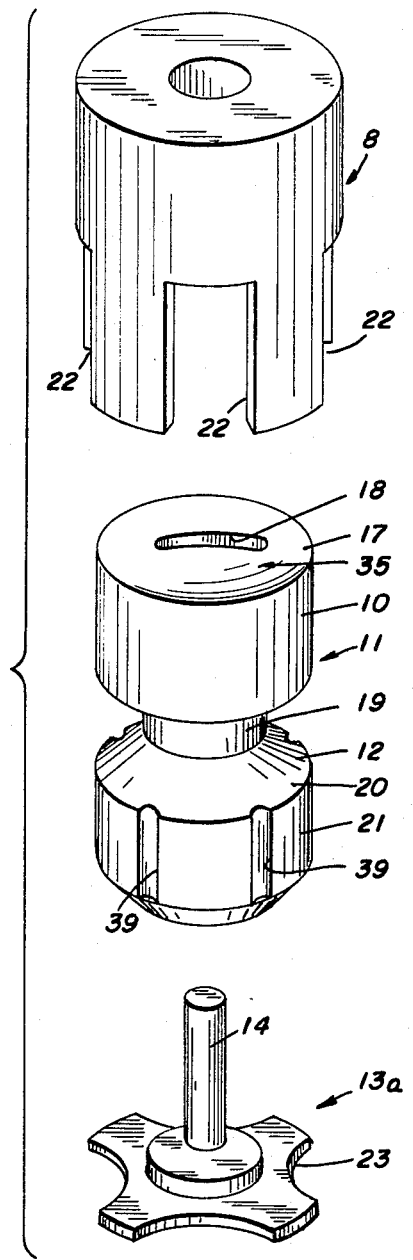

United States Patent Office 3,385,301
Patented May 28, 1968

3,385,301
BALLOON CATHETER HAVING A DEFORMABLE ONE-WAY INFLATION VALVE
Andrew Harautuneian, Gardena, Calif., assignor, by mesne assignments, to American Hospital Supply Corporation, a corporation of Illinois
Filed Oct. 11, 1965, Ser. No. 494,646
7 Claims. (Cl. 128—349)

ABSTRACT OF THE DISCLOSURE

In a balloon-catheter including a dual passage in which one passage is used to direct fluid into a patient and the other passage is used to direct an inflating fluid to the inflatable retention balloon of the catheter, and an improved valve assembly for controlling the passage of fluid to the retention balloon in which the valve is manually operable and normally closed, the valve assembly including a relatively rigid housing received in the other passage and permitting fluid to pass therethrough and having lateral slots permitting fluid to enter the housing, the housing having an upper opening surrounded by a depending valve seat, and a resilient, flexible, and deformable valve member including an upper sealing head engageable sealingly on said valve seat and integral with a reduced diameter, axial neck integral with a tubular body by means of an axially deformable angular shoulder which is normally compressed axially in the other passage for urging the sealing head toward said valve seat.

This invention relates to an improved valve for a balloon catheter.

Balloon catheters are frequently used for bladder irrigation or drainage. These catheters include an inflatable balloon near one end of a dual passage catheter tube. A first passage is for fluid drainage from the patient and a second passage leads to an interior of the balloon. This balloon is inflated by injecting a liquid through this second passage to the balloon by means of a syringe. The syringe uses a needle that pierces a rubber diaphragm or uses a Luer tapered tip that attaches to and operates a valve in the second passage.

A previous type of syringe operated valve had a valve housing with a seat therein and a generally T-shaped movable valve member with an enlarged head. An undersurface of this head seals with the valve housing seat. A syringe tip pushing against an actuating leg of the movable T-shaped valve member opens the valve. This valve is normally held in a closed position by a separate spring or piece of sponge.

Such a valve does, however, create problems. The underside of the cross head which seats against a valve seat of the valve housing must be soft and flexible enough to form a good liquid-tight seal with the valve housing. The actuating leg of the T-shaped valve member of a sufficiently soft and flexible material lacks columnar rigidity. When a physician or nurse jams a hypodermic syringe tip very firmly into the valve housing to actuate the valve as they sometimes do, the actuating leg decreases in columnar length and flares or bulges radially outwardly. Thus, even though the cross head may lift from the valve seat slightly, the flared-out actuating leg will block liquid passage through the valve housing.

This blockage can also occur when the physician attempts to deflate the balloon or remove the inflating liquid. In such an instance, he must retract the syringe very slightly and try by relieving pressure on the actuating leg to reduce its blocking bulged portion. If he removes the syringe too far, liquid will leak around the syringe tip.

If the actuating leg of the T-shaped movable valve has high columnar rigidity and is of a material such as rigid plastic, the cross head does not form a reliable seal against the mating rigid valve seat of the valve housing. Therefore, separate resilient gaskets or rubber washers must be added to each T-shaped valve member. These syringe operated valves are very small and adding such gaskets is tedious and expensive. These small gaskets can wrinkle and let liquid seep past them. Also, since these inflation catheters are disposed after one-time use, the cost of these catheters including the valve must be kept to a minimum.

To overcome the difficulties previously set forth in the existing catheter valves, I have invented an improved valve for a catheter. My valve requires no separate springs or sponges, no actuating leg which can block the liquid passage, and provides a reliable resilient seating member.

Other objects and the nature of the invention will become apparent upon consideration of the following description of exemplary embodiments when taken in conjunction with the drawing forming a part thereof, in which:

FIGURE 5 is an exploded perspective view of the valve assembly of FIGURE 3.

Figure 1:
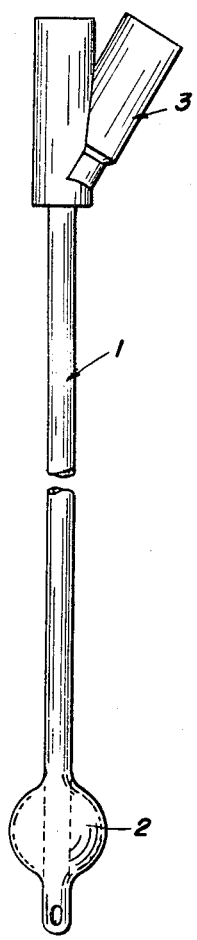
FIGURE 1 is a side elevational view of the complete catheter.
Figure 2:
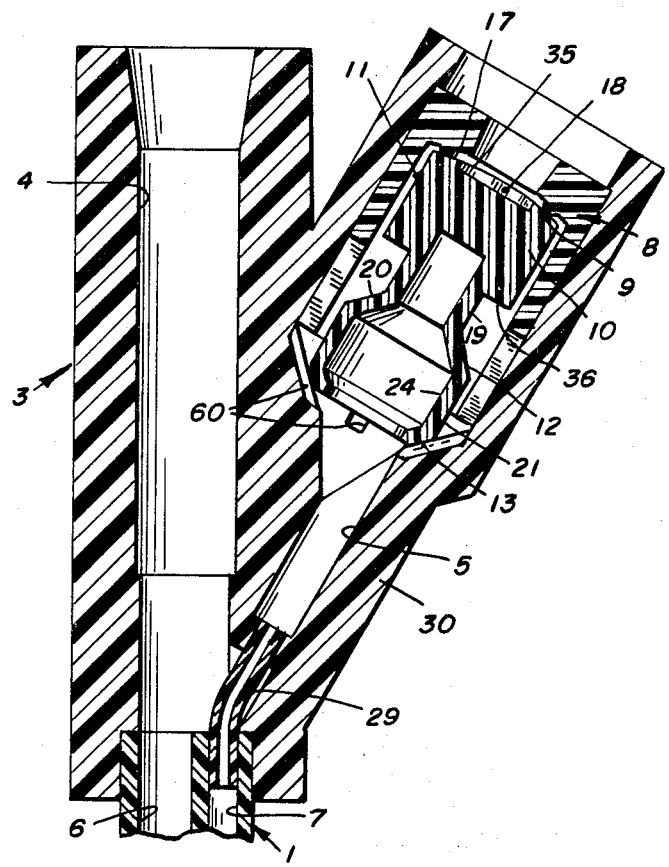
FIGURE 2 is a cross-sectional view of the connector, including therein the valve assembly.

Referring now to the drawings, FIGURES 1 and 2 show the connector 3 joined to a dual passage catheter tube 1 having a drainage passage 6 and an inflation passage 7. At the forward end of catheter tube 1 is an inflatable retention balloon 2. Connector 3 has a primary passage 4 interconnecting with the drainage passage 6 of catheter tube 1 and a secondary passage 5 interconnecting with inflation passage 7 of the catheter tube 1. The interconnection between secondary passage 5 and inflation passage 7 is made by a rigid tubular splicing member 29.

Within secondary passage 5 of the connector is a valve assembly. This valve assembly includes a valve housing 8 which has an opening or passage therethrough with a valve seat 9 therein.

Within valve housing 8 is a one-piece flexible, resilient, elastic valve member 11. This valve member has a sealing head 10 with an upper surface 35 for sealing with the valve seat 9 around an annular peripheral sealing portion 17. Also, within the top surface 35 of sealing head 10 is a slot 18 in a central portion thereof which stops short of the peripheral sealing portion 17. Fluid from a syringe tip 50 can flow out through this slot 18 when the valve is actuated by the syringe tip.

The sealing head 10 is urged against valve seat 9 by a resilient, flexible, hollow, longitudinally-collapsible portion 12. A tubular body 21 of collapsible portion 12 has a cavity 24 therein and necks in along a lateral sloping shoulder 20 to a neck 19 that integrally joins with a bottom surface 36 of sealing head 10.

Figure 3:
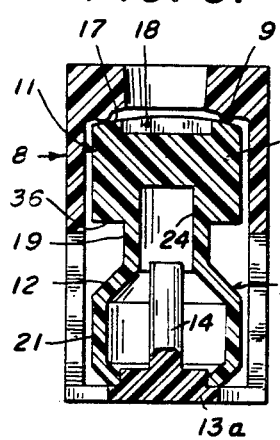
FIGURE 3 is an enlarged cross-sectional view of a modified valve assembly with the valve member in closed position.
Figure 4:
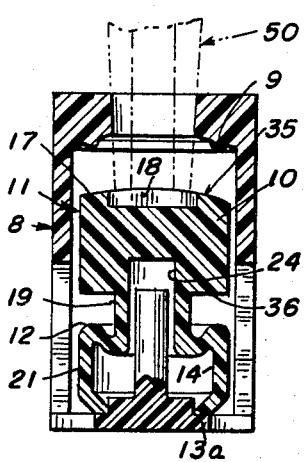
FIGURE 4 is an enlarged cross-sectional view of the valve assembly of FIGURE 3 with the valve member in open position.

A stop means may be either a portion 13 of the connector 3, as shown in FIGURE 2, or a separate element 13a, as shown in FIGURES 3, 4, and 5. These stop means hold the hollow collapsible portion in a partially collapsed position, thus constantly urging sealing head 10 against valve seat 9, keeping the valve closed until actuated. The stop means in FIGURE 2 is tapered to form a funnel-shaped mouth which centrally aligns the valve member 11 in the valve housing passage. Also, grooves 60 are provided in the funnel-shaped mouth of the fluid passage around the bottom end of the hollow collapsible portion 12 of valve member 11.

One embodiment of my invention includes a separately formed stop means 13a in the form of a stop plate across the secondary passage 5 of the valve housing 8. The stop plate has a guide pin 14 for laterally aligning the one-piece valve member 11 as it moves up and down. Such a guide pin 14 fits within hollow cavity 24 of collapsible portion 12 and insures that the top surface 35 of sealing head 10 is axially aligned with the syringe tip 50 and will properly seat against valve seat 9.

In the exploded view of FIGURE 5, the embodiment using a separate stop means with side openings 23 and guide pin 14 is shown. The three assembled elements present a simple reliable valve for a medical retention catheter. The valve housing 8 is shown with side passages 22 to insure adequate fluid flow into and out of secondary passage 5 of side arm 30. The hollow collapsible portion 12 of valve member 11 can also have fluid channels 39.

The valve member of my invention is made of a material sufficiently resilient and elastic to provide a hollow collapsible portion 12 which urges sealing head 10 against valve seat 9 with sufficient force to form a liquid-tight seal. Since this material is soft and resilient, it also forms a tight seal without the use of extraneous gaskets and the like. I have found that a rubber valve member 11 works particularly well when used in combination with a rigid valve housing 8.

I have used specific examples to illustrate my invention. However, certain modifications can be made by those skilled in the art without departing from the spirit and scope of this invention.

I claim:

1. A retention catheter comprising, in combination:
   a catheter tube with separated drainage and inflation passages extending the length thereof;
   an inflatable balloon on one end of said catheter tube and internally communicating with said inflation passage; and
   a connector on the other end of said tube and having separate drainage and inflation passages respectively communicating with the drainage and inflation passages of said tube;
   a valve assembly in said connector inflation passage for controlling fluid flow therethrough;
   said valve assembly comprising a substantially rigid housing including an inwardly direct portion having an opening therethrough for receiving the tip of a syringe or the like therethrough for introducing and removing fluid from said inflatable balloon;
   said inwardly directed portion including a valve seat on the inner surface thereof and surrounding said opening;
   said housing including at least one lower opening for permitting fluid to flow into said housing to and from said catheter inflation passage;
   a stop plate at the end of said housing having an inner surface opposite said opening and including a portion permitting fluid to flow thereby to and from said balloon;
   said valve assembly including a deformable, one-piece elastic valve member comprising a sealing head reciprocable in said housing and including a sealing surface in opposed relation to said housing valve seat,
   said sealing head being relatively thick axially and including a depending, reduced diameter neck integral with an increased diameter shoulder integral with a depending thin-walled axially deformable, hollow body abuttingly engaged at a lower edge portion with the inner surface of said plate,
   the axial length of said valve member from said sealing surface to the lower edge portion of said hollow body being greater than the axial distance from the inner surface of said stop plate to said valve seat whereby said valve member is normally axially deformed and said valve head sealing surface is normally urged into sealed relation with said valve seat.

2. The structure as claimed in claim 1 in which said valve member sealing head includes an elongated groove surrounded by said sealing surface outwardly of said groove, facilitating the introduction and removal of fluid through said valve assembly.

3. The structure of claim 1 in which said valve seat comprises a depending continuous rib, said valve sealing head having a concave radius.

4. The structure of claim 1 in which said housing opening is tapered toward said valve seat for sealing by engaging the outer surface of a syringe tip.

5. The structure as set forth in claim 1 in which said reduced diameter neck is substantially hollow, said stop plate including an integral guide post projecting axially through said hollow body and guidingly receivable within said hollow neck.

6. The structure as claimed in claim 1 in which said hollow body includes at least one longitudinally extending, external groove extending the length of said hollow body.

7. A retention catheter comprising: a catheter tube with longitudinal drainage and inflation passages therein; an inflation balloon secured to an external surface of said catheter tube; a connector joined to one end of the catheter, the connector having drainage and inflation passages joining respectively with drainage and inflation passages of the catheter tube, said inflation passage of the connector defined by a wall that has a funnel section converging inwardly with at least one slot in this funnel section for fluid flow; and a valve assembly secured within the inflation passage above said funnel section, said valve assembly comprising a substantially rigid housing including an inwardly directed portion having an opening therethrough for receiving the tip of a syringe or the like therethrough for introducing and removing fluid from said inflatable balloon; said inwardly directed portion including a valve seat on the inner surface thereof and surrounding said opening; said housing including at least one lower opening for permitting fluid to flow into said housing to and from said catheter inflation passage funnel section slot; said valve assembly including a deformable, one-piece elastic valve member comprising a sealing head reciprocable in said housing and including a sealing surface in opposed relation to said housing valve seat, said sealing head being relatively thick axially and including a depending, reduced diameter neck integral with an increased diameter shoulder integral with a depending thin-walled axially deformable, hollow body abuttingly engaged at a lower edge portion with said funnel section inflation passage, the axial length of said valve member from said sealing surface to the lower edge portion of said hollow body being greater than the axial distance from the inner surface of said funnel section to said valve seat whereby said valve member is normally axially deformed and said valve head sealing surface is normally urged into sealed relation with said valve seat; said catheter tube, balloon, connector and valve assembly all operatively connected together to provide a retention catheter ready for insertion into a patient.

References Cited

UNITED STATES PATENTS

| | | | |
|---|---|---|---|
| 244,468 | 7/1881 | McElroy | 137—216.2 |
| 1,758,625 | 5/1930 | Saul | 137—223 |
| 2,789,577 | 4/1957 | Hosking | 137—525 X |
| 3,087,492 | 4/1963 | Garth | 128—350 |
| 3,112,748 | 12/1963 | Colburn | 128—350 |

FOREIGN PATENTS 837,897  6/1960  Great Britain.

DALTON L. TRULUCK, *Primary Examiner.*

RICHARD A. GAUDET, *Examiner.*